Sept. 3, 1963     R. H. BAMFORD ET AL     3,102,466
AGRICULTURAL BALERS
Filed July 6, 1962     3 Sheets-Sheet 1
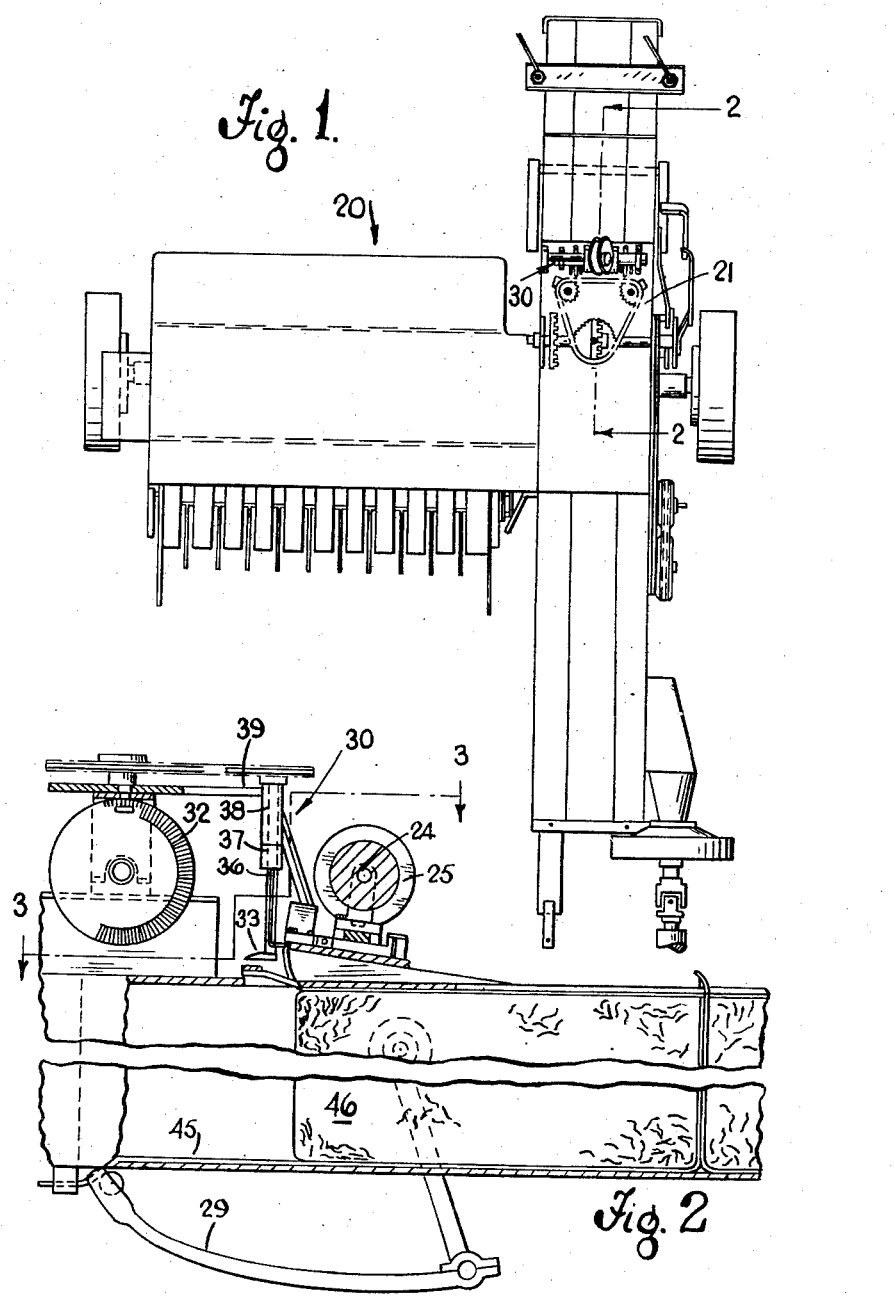
INVENTORS
RICHARD HAWTHORN BAMFORD
RUPERT CYRIL BAMFORD
BY *A. Yates Dowell*
ATTORNEY Sept. 3, 1963　　　R. H. BAMFORD ET AL　　　3,102,466
AGRICULTURAL BALERS
Filed July 6, 1962　　　　　　　　　　　　3 Sheets-Sheet 2
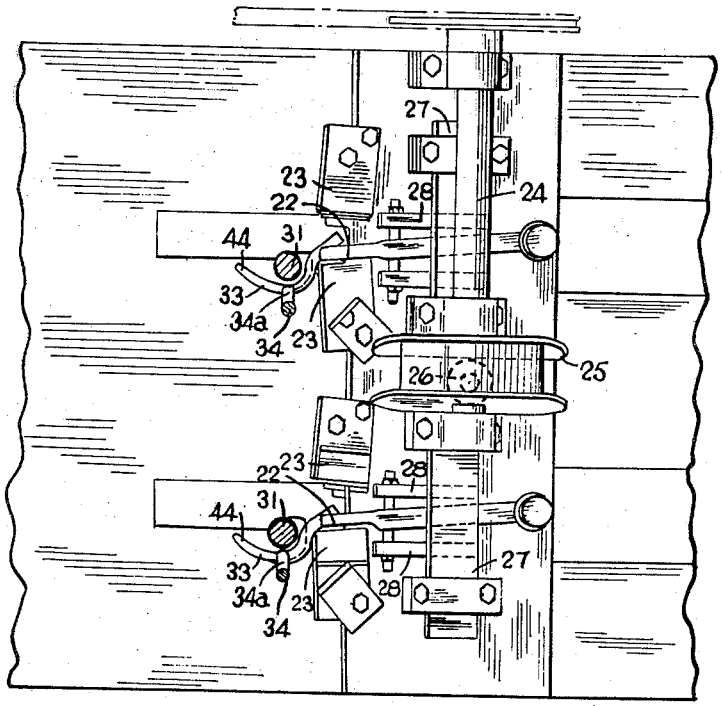
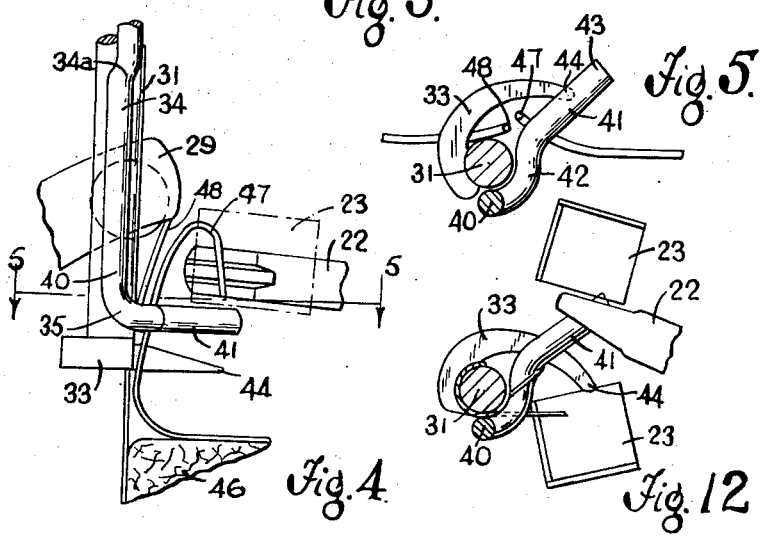
INVENTORS
RICHARD HAWTHORN BAMFORD
RUPERT CYRIL BAMFORD
ATTORNEY

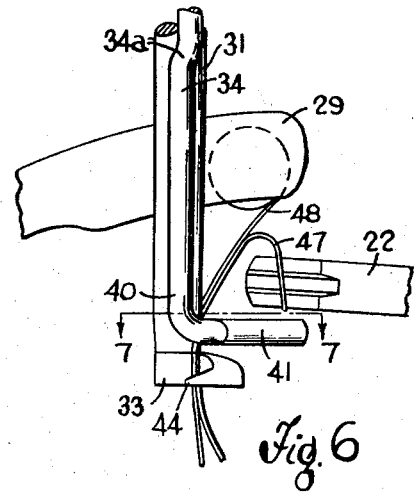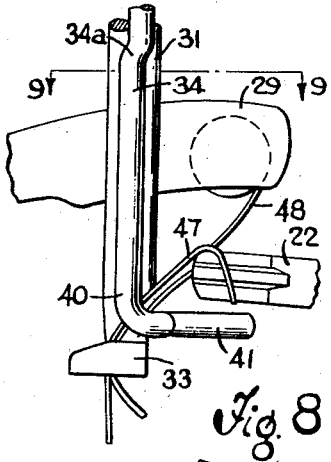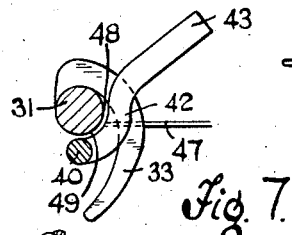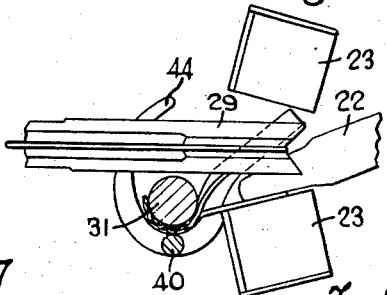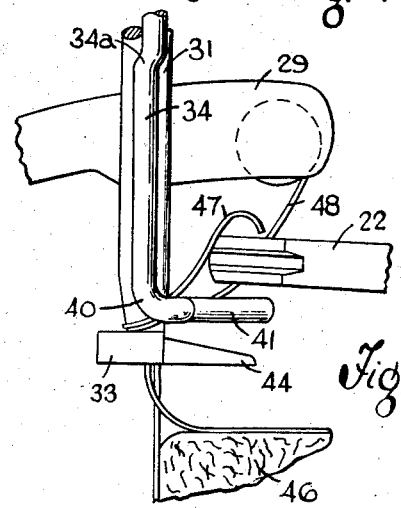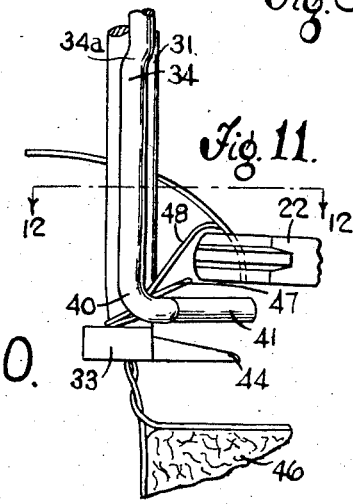

United States Patent Office 3,102,466
Patented Sept. 3, 1963

3,102,466
AGRICULTURAL BALERS
Richard Hawthorn Bamford, Coton-in-the-Clay, near Sudbury, County of Derby, England, and Rupert Cyril Bamford, Flat No. 1, The Manor House, High St., Uttoxeter, England
Filed July 6, 1962, Ser. No. 208,051
Claims priority, application Great Britain July 8, 1961
4 Claims. (Cl. 100—21)

This invention relates to agricultural machines for baling hay, straw, and other crops, and is concerned in particular with a new or improved bale wire tying device thereof. The invention is applicable to pick-up balers as well as to stationary balers and other agricultural machines, for example, stationary threshing machines which are adapted also to bale the crop.

The invention is concerned with that particular kind herein referred to as the kind specified, of bale wire tying device which comprises wire twisting means embodying a twister hook shaft carrying a twister hook, and a wire deflector rod extending in side-by-side relation with the twister hook shaft so as to be spaced a small distance therefrom, the arrangement being such that during the formation of the wire tie of each bale the two portions of wire to be twisted together are brought through the space between the twister hook shaft and deflector rod simultaneously with the rotation of the shaft and its associated hook, which, by its engagement with the two wire portions, twists these around one another to effect the tying operation.

In bale wire tying devices of the above kind as hitherto known, so far as we are aware, the wire deflector rod has terminated in a free end portion extending parallel to or at an inclination to the length of the adjacent twister hook shaft, with the free end portion of the rod in side-by-side relation therewith and terminating above the plane of rotation of the twister hook adjacent the hub portion of the hook i.e. where the twister hook is connected to the associated shaft.

With such an arrangement the free end portion of the deflector rod in all rotatable positions of the twister hook is spaced away from the extremity of the hook so as to leave therebetween a space of appreciable width, usually of the order of about 1 to 1½ inches and we have found that it happens from time to time that prior to the commencement of the twisting operation one of the two portions of wire to be twisted together escapes out of the aforementioned small space between the deflector rod and the twister hook shaft and through this appreciable space between the free end of the rod and the extremity of the twister hook so that the wire brought around the associated bale is not tied and this accordingly falls apart when discharged from the machine.

The present invention has for its object the provision of an improved arrangement which avoids this disadvantage of the hitherto known construction.

According to the present invention the wire deflector rod is provided at the said free end portion with a wire retaining part which extends transversely of the length of the rod by a distance such as to be adapted at least partially to overlap with each part of the twister hook during the continued rotation thereof past the retaining part of the rod, the arrangement being such that as the extremity of the twister hook advances into over-lapping relation with the wire retaining part of the deflector rod, the retaining part serves to close the open side of the hook and thus retain the two wire portions within the hook at the commencement of the twisting operation.

With such improved arrangement, from tests which we have carried out, it appears that there is no risk at all of the two wire portions failing to be twisted together or at least such risk is so negligible as to be of no practical significance so that the disadvantage above referred to of the existing construction is avoided.

We have further found that, insofar as both wire portions are effectively retained within the hook opening at the commencement of the twisting operation, the new length of wire which is brought up in the known manner by the wire carrying needle and which is twisted around the previously severed end portion of wire, may invariably be severed at a position such that in the finished tie the two severed ends of wire are substantially opposite to one another, as is desirable if safe and reliable twists are to be made.

With the hitherto known construction, even if one wire portion does not escape out of the hook opening past the free end portion of the deflector rod, one wire portion may often move by an uncontrolled amount past the free end of the deflector rod relative to the other wire portion about which it is to be twisted, with the result that the two severed ends at the conclusion of the tying operation are not substantially opposite to one another with one severed end projecting by an appreciable distance beyond the other end so as to produce an unsightly tie involving wastage of wire and with the risk that one wire will be too short to be twisted effectively to the other wire.

Preferably, the wire retaining part of the deflector rod is of cranked configuration, with the cranked portion of arcuate form so as to extend partially around the adjacent side of the twister hook shaft and thereby ensure that the extremity of the retaining part is brought into a position for overlapping with the extremity of the twister hook at the earliest possible stage in the twisting operation.

In other words, by providing a wire retaining part of cranked configuration, the extremity of the retaining part is brought into a position for overlapping with the extremity of the twister hook at a position earlier in the rotational movement thereof as the hook commences its cycle of operations than would otherwise be the case if the retaining part were not cranked.

The deflector rod is preferably made resilient as by forming it in mild steel or alternatively of spring steel so as to permit of the cranked portion aforementioned being normally spaced from the twister hook shaft by a distance less than the diameter of the wire but permitting of it moving away from the shaft by a distance sufficient to accommodate the two wire portions therebetween, such an arrangement serving even more effectively to retain the two wire portions in the desired position for twisting together.

Preferably the retaining part of the deflector rod is made of a sufficient length as to project beyond the outer periphery of the twister hook so as completely as opposed to partially to overlap therewith.

The invention is illustrated in the accompanying drawings, wherein:

FIGURE 1 is a plan view of a pick-up baler which is provided with one particular form of bale wire tying device in accordance with this invention, FIGURE 2 is a sectional view to an enlarged scale on the line 2—2 of FIGURE 1, depicting in more detail the wire tying device of the baler shown in FIGURE 1, FIGURE 3 is a plan view to an enlarged scale of part of the construction shown in FIGURES 1 and 2, and the plan view being taken substantially on the broken line 3—3 in FIGURE 2, FIGURE 4 is a side elevation to an enlarged scale of one of the two twisting hooks, with its associated shaft and wire deflector rod depicting the position of the parts just prior to the commencement of the formation of a bale tie, FIGURE 5 is a part-sectional plan view on the line 5—5 of FIGURE 4, FIGURE 6 is a view similar to FIGURE 4, showing a further stage of the wire tying operation, FIGURE 7 is a part-sectional plan view on the line 7—7 of FIGURE 6, FIGURE 8 is a view similar to FIGURE 4, showing a further stage of the wire tying operation, FIGURE 9 is a part-sectional plan view on the line 9—9 of FIGURE 8, FIGURES 10 and 11 are views similar to FIGURE 4 showing two further stages in the wire tying operation, FIGURE 12 is a part-sectional plan view on the line 12—12 of FIGURE 11.

Referring to the drawings, the pick-up baler which is intended for baling hay or straw in the field and is generally designated at 20, comprises a bale-forming chamber 21 above which is disposed bale tying means comprising a pair of wire gripping means with each of which is provided a wire tying device.

Each gripping means comprises, as shown more particularly in FIGURE 3, a wire gripping finger, 22, which is adapted to oscillate between a pair of wire gripping abutments 23, each finger being driven by tying means driving shaft 24 which is driven intermittently in the known manner so as to rotate during each bale tying operation.

The shaft 24 carries cam 25 which engages cam follower 26 mounted on slide 27 carrying driving bars 28 which serves to oscillate each of the two wire gripping fingers 22 between each corresponding pair of the said abutments 23.

In association with each of the two wire gripping means is a wire feeding needle 29 (see FIGURE 2) driven in the known manner in timed relation with the rotation of shaft 24, and serving to feed the wire in the known manner for forming the bale ties.

The bale tying means also comprises a pair of wire twisting devices, i.e. wire tying devices generally designated at 30 and each comprising a vertically dependent twister hook shaft 31 adapted to be rotated during each bale tying operation by intermittently rotated gear 32 driven from the tying means driving shaft 24. Each twister hook shaft 31 carries at its lower end a twister hook 33.

Each wire tying device further comprises the provision, in vertically dependent side-by-side relation with each twister hook shaft 31, of a mild or spring steel deflector rod 34, of round section. Each of the two rods 34 is cranked at 34a, see FIGURE 4, substantially medially between its upper and lower ends, i.e. at a position some two or three inches above its lower end 35, the arrangement permitting of the upper end 36 of the rod 34 being spaced away from the twister hook shaft 31, and supported within a boss 37 provided at one side of a bearing portion 38 for the rotatable hook shaft 31, such boss and bearing portion being carried on a bracket 39 supported from the baler frame.

The lower of the two vertical portions, namely, 40 of the cranked deflector rod 34 is spaced by a small distance, of the order of the wire diameter dimension from the adjacent side of the twister hook shaft 31. At its lower end 35 the rod 34 is formed with a horizontally extending wire retaining part 41. This wire retaining part 41 comprises a portion 42 of cranked configuration, such cranked portion being of arcuate i.e. part-circular configuration and extending partially around the adjacent side of the shaft 31 in a direction from the rod 34 which is opposite to the designed direction of rotation of the shaft 31, namely, clockwise in FIGURE 3, and the extent by which this cranked part-circular portion 42 extends around the shaft preferably amounts to an angular distance of about 120° as measured at the centre of the shaft 31.

The cranked part-circular portion 42 of the wire retaining part 41 terminates in a straight portion 43 extending substantially radially in relation to the centre of the twister hook shaft 31 and by a distance such as to project beyond the outer periphery of the twister hook 33.

Both the straight and cranked portions 43, 42, of the wire retaining part extend in a horizontal direction, i.e. at right angles to the length of the adjacent part of the rod 34 and at a level just above the highest part of the upper end face of the twister hook 33 so as to provide merely for rotational clearance therebetween.

The rod is so positioned, having regard to the configuration aforementioned of its wire retaining part, that on rotation of the twister hook shaft 31 by an angular distance of approximately 180° from its normal inoperative position depicted in FIGURE 3, the extremity 44 of the twister hook 33 is brought beneath the straight portion 43 of the wire retaining part 41 which thus overlaps with the extremity 44 of the hook as shown in FIGURE 5.

The operation of the foregoing wire tying device will now be described. At the commencement of each bale tying operation, there will in association with each of the two wire tying devices, be a length of wire 45 extending around the bale 46 of hay or other agricultural crop material as shown in FIGURE 2.

One end 47 of this length of wire 45 will be held between the corresponding wire gripping finger 22 and one of the two abutments 23, as indicated diagrammatically in FIGURE 4, this length of wire continuing beyond the underside of the bale 46 and around the free end of the needle 29 as shown in FIGURE 2.

In this position each twister hook 33 is in the rotational position depicted in FIGURE 3, i.e. with the extremity 44 of the twister hook disposed at the opposite side of the hook shaft 31 to the wire retaining part 41.

With the parts as so far described, the already gripped end portion 47 of the length of wire will be gripped at the side of the wire retaining part 41 which is nearest to the open side or mouth of the twister hook 33, i.e. is on the side of the retaining part 41 which is rearmost in relation to the designed direction of rotation of the twister hook, namely, clockwise as viewed in plan, i.e. in FIGURES 3 and 5.

With the initiation of the bale tying operation so that the shaft 24 commences to rotate and the needle 29 advances to the operative position depicted in FIGURE 4, a fresh portion 48 of the wire length will be brought up by the needle into a position adjacent the end portion 47 which is gripped between the finger 22 and the one abutment 23, such fresh portion 48 of wire being brought up by the needle past the at present open side of the hook opening so that both portions 47 and 48 of the wire are now as shown in FIGURE 5, at the side of the straight retaining portion 43 which is rearmost in the direction of angular rotation of the twister hook 33.

As soon as the fresh portion 48 of wire has been brought into position by needle 29 ready for twisting around the already gripped wire end portion 47, the twister hook shaft 31 will have rotated the twister hook 33 in a clockwise direction through substantially 180° from the initial position depicted in FIGURE 3, into the position depicted in FIGURE 5, in which its extremity 44 is now in overlapping relating with the straight portion 43 of the wire retaining part 41, so as, as shown in FIGURES 4 and 5 effectively to close the mouth of the hook opening with the two wire portions 47 and 48 therein.

Then as the twister hook 33 continues to be rotated by its associated shaft 31 into the position depicted in FIGURES 6 and 7, the two wire portions 47, 48 are forced by their progressive engagement with the inner periphery of the curved hook 33 into the space 49 between the hook shaft 31 and the arcuate cranked portion 42 of the wire retaining part 41.

As the twister hook continues to rotate further into the positions depicted in FIGURES 8 and 9, the two wire portions 47, 48 are now twisted around one another to form the bale tie, the resilience of the deflector rod 34 permitting of the cranked portion 42 of its wire retaining part 41 moving away from the shaft 31 by a distance sufficient to accommodate the twisted together wire portions therebetween as shown in FIGURE 9.

Once the two wire portions 47, 48 have started to be twisted together as the wire portions 47, 48 first pass between the arcuate cranked portion of the retaining part and the shaft 31, the previously severed end portion 47 which was previously held, is released as shown in FIGURE 10, by the gripping finger 22 moving away from the one abutment 23 aforementioned, the gripping finger moving in a clockwise direction as viewed in plan in so doing. At this stage of the operation, there is no danger of the previously gripped wire portion 47 separating from the portion 48; and as the parts, including the gripping finger 22 moves into the final position depicted in FIGURES 11 and 12, to engage with the other of the two abutments 23, it now severs the wire portion 48 in the manner described in the prior specification, so as now to free both portions 47, 48 of the twisted together ends of the wire tie and thus permit of the tied bale being discharged as the twister hook finally returns in the known manner to its open position depicted in FIGURE 3.

At the same time, the end of the length of wire which has been severed from the portion 48, is gripped by the finger 22 in the position depicted in FIGURES 11 and 12 so as to be held ready for the next bale tying operation.

What we claim then is:

1. In a machine for baling hay, straw and other agricultural crops, the provision of a bale wire tying device comprising:
   (a) a rotatable shaft carrying a twister hook on one end of said shaft,
   (b) said twister hook extending transversely of the length of the rotatable shaft with its extremity spaced transversely in respect of the axis of rotation of said shaft,
   (c) means for effecting periodical rotation of said twister hook shaft,
   (d) a wire deflector rod extending in side-by-side relation with the twister hook shaft and terminating in a free end portion adjacent said twister hook,
   (e) said rod being spaced from said shaft to receive bale tying wire therebetween,
   (f) means for feeding bale tying wire through the space between said rod and said shaft,
   (g) the free end portion of said rod embodying a wire retaining part extending transversely in relation to the adjacent part of said rod,
   (h) said transversely extending wire retaining part having its extremity spaced transversely from the axis of rotation of the twister hook shaft by a distance not less than the distance by which the twister hook extremity is spaced from said shaft axis so that the wire retaining part is adapted to overlap with the extremity of the twister hook during each rotation thereof.

2. A machine according to claim 1 wherein the twister hook shaft is of circular form and the wire retaining part of the deflector rod is disposed on the side of the twister hook shaft opposite to the deflector rod and is connected to the deflector rod by a connecting portion of arcuate form which extends partially around the adjacent side of the twister hook shaft.

3. A machine according to claim 1 wherein the twister hook shaft is of circular form and the wire retaining part of the deflector rod is disposed on the side of the twister hook shaft opposite to the deflector rod and is connected to the deflector rod by a connecting portion of arcuate form which extends partially around the adjacent side of the twister hook shaft, and the deflector rod is formed of resilient material and its free end portion is movable transversely in relation to the twister hook shaft.

4. In a machine for baling hay, straw and other agricultural crops, the provision of a bale wire tying device comprising:
   (a) a rotatable shaft carrying a twister hook on one end of said shaft,
   (b) said twister hook extending transversely of the length of the twister hook shaft with its extremity spaced radially in relation to the axis of rotation of said shaft,
   (c) means for effecting periodical rotation of said twister hook shaft,
   (d) a wire deflector rod extending in side-by-side relation with the twister hook shaft and terminating in a free end portion adjacent said twister hook,
   (e) said rod being spaced from said shaft to receive bale tying wire therebetween,
   (f) means for feeding bale tying wire through the space between said rod and said shaft,
   (g) the free end portion of said rod embodying a wire retaining part extending transversely in relation to the adjacent part of said rod,
   (h) said wire retaining part extending radially outwardly from the circle defined by the extremity of the twister hook during its rotation.

References Cited in the file of this patent
FOREIGN PATENTS

| | | |
|---|---|---|
| 741,339 | France | Dec. 3, 1932 |
| 824,498 | Great Britain | Dec. 2, 1959 |